United States Patent
Wu

(10) Patent No.: US 8,245,843 B1
(45) Date of Patent: Aug. 21, 2012

(54) COVER FOR ELECTRONIC DEVICE

(75) Inventor: Ching-Chung Wu, New Taipei (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 0 days.

(21) Appl. No.: 13/306,992

(22) Filed: Nov. 30, 2011

(30) Foreign Application Priority Data

Oct. 31, 2011 (TW) .............................. 100139530 A

(51) Int. Cl.
*B65D 85/00* (2006.01)
(52) U.S. Cl. ........................................ 206/320; 150/165
(58) Field of Classification Search .................. 206/576, 206/320, 701; 150/154, 165
See application file for complete search history.

(56) References Cited

U.S. PATENT DOCUMENTS

| | | | |
|---|---|---|---|
| 7,723,947 B2* | 5/2010 | Stenroos et al. | 320/101 |
| 7,952,322 B2* | 5/2011 | Partovi et al. | 320/108 |
| 2009/0273309 A1* | 11/2009 | Kuo | 320/101 |
| 2009/0314400 A1* | 12/2009 | Liu | 150/165 |
| 2010/0078343 A1* | 4/2010 | Hoellwarth et al. | 206/320 |
| 2011/0090626 A1* | 4/2011 | Hoellwarth et al. | 361/679.01 |
| 2011/0188176 A1* | 8/2011 | Kim | 361/679.01 |
| 2011/0204843 A1* | 8/2011 | Foster | 320/101 |
| 2011/0227527 A1* | 9/2011 | Zhu et al. | 320/108 |
| 2011/0240448 A1* | 10/2011 | Springer et al. | 200/331 |
| 2011/0241607 A1* | 10/2011 | Wiegers | 320/108 |
| 2011/0260674 A1* | 10/2011 | Dai | 320/101 |
| 2011/0290686 A1* | 12/2011 | Huang | 206/320 |

* cited by examiner

*Primary Examiner* — Jacob L Ackun
(74) *Attorney, Agent, or Firm* — Altis Law Group, Inc.

(57) ABSTRACT

The cover includes an interface, a bottom cover and a top cover. The interface is for connecting components embedded in the cover with the electronic device. The bottom cover and the top cover are connected by a hinge and the top cover is divided into at least three parts. Every adjacent two foldable parts can be folded relative to each other to a certain degree such that the top cover is folded to support the electronic device at a certain degree The at least three parts of the top cover includes at least one induction coil which is placed in one of the at least three parts. The top cover is folded to support the electronic device at a certain degree while the induction coil is used to charge for the electronic device.

17 Claims, 4 Drawing Sheets

COVER FOR ELECTRONIC DEVICE

BACKGROUND

1. Technical Field

The present disclosure relates to electronic device covers, and particularly to a cover with a charging function.

2. Description of Related Art

Currently, some electronic device covers include an induction coil that must be placed onto a charging base to charge the electronic device. However, because only one coil is provided, orientation of the electronic device during charging is limited making it difficult for users to continue using the device while it is being charged.

BRIEF DESCRIPTION OF THE DRAWINGS

The components of the drawings are not necessarily drawn to scale, the emphasis instead being placed upon clearly illustrating the principles of the present disclosure. Moreover, in the drawings, like reference numerals designate corresponding parts throughout several views.

DETAILED DESCRIPTION

Figure 1:
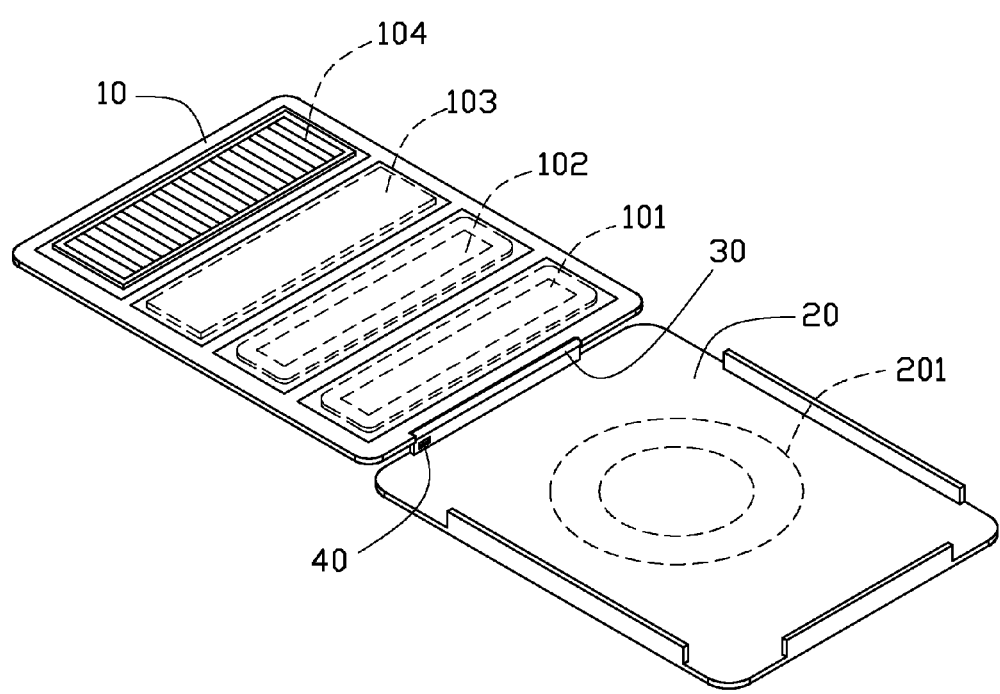
FIG. 1 is an isometric view of a cover of an electronic device in accordance with an exemplary embodiment.

Referring to FIG. 1, a cover 1 includes a top cover 10 and a bottom cover 20 connected by a hinge 30. The cover 1 further includes an interface 40 for connecting to an electronic device (not shown). A first induction coil 201 is embedded in the bottom cover 20 and is electrically connected to the interface 40.

Figure 2:
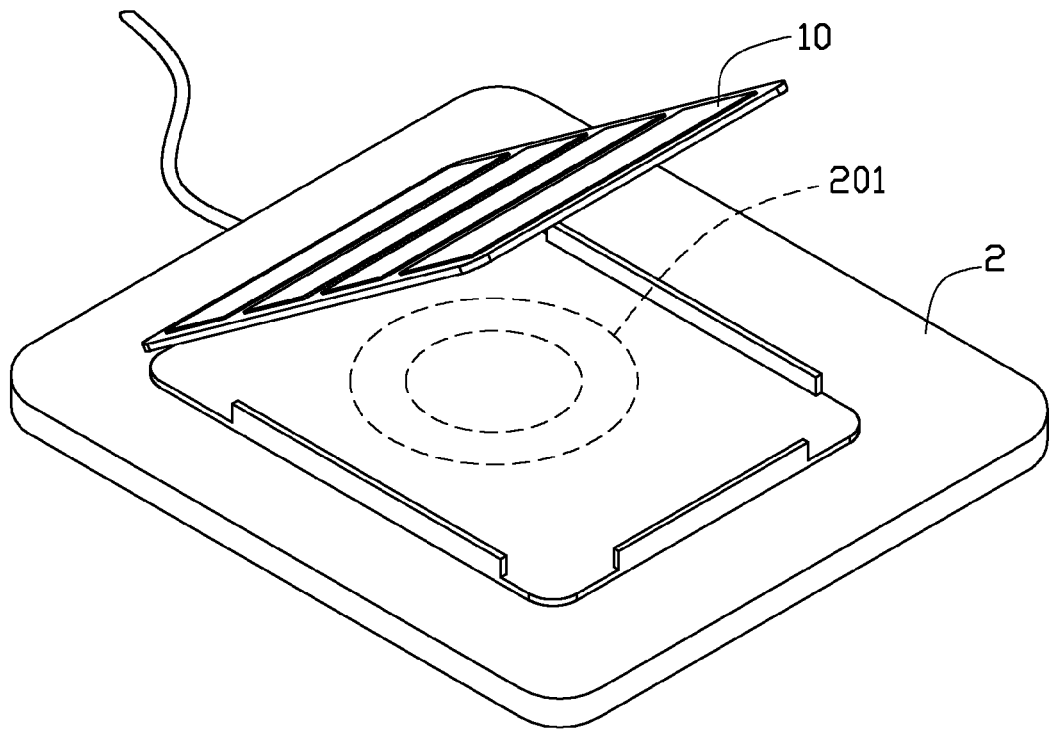
FIG. 2 is an isometric view of a first induction coil of the cover of FIG. 1 being used to charge the electronic device.

As shown in FIG. 2, the bottom cover 20 is placed onto a charging base 2 having a primary induction coil (not shown) to charge the electronic device.

The top cover 10 is substantially sheet-shaped and transversely divided into four parts. Every adjacent two parts can be folded relative to each other a certain degree such that the top cover 10 is folded to support the electronic device at a certain degree. The four parts respectively include imbedded therein a second induction coil 101, a third induction coil 102, a battery 103, and a solar panel 104. The second induction coil 101 and the third induction coil 102 are both connected to the interface 40 and the battery 103. The battery 103 is connected to the interface 40. The solar panel 104 has surfaces exposed from the top cover 10 and is connected to the interface 40 and the battery 103. The solar panel 104 can provide supplementary charging when exposed to light and the cover 1 is not placed on the charging base 2 in folded position.

Figure 3:
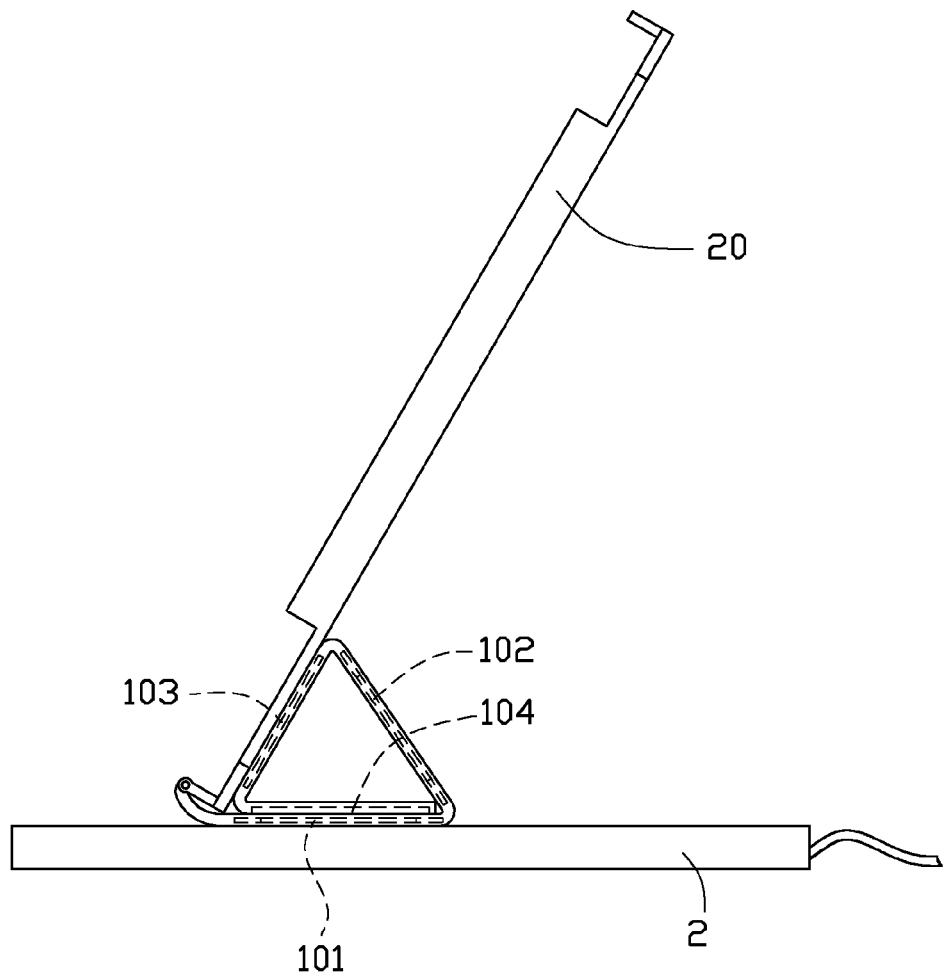
FIG. 3 is an isometric view of a second induction coil of the cover of FIG. 1 being used to charge the electronic device.
Figure 4:
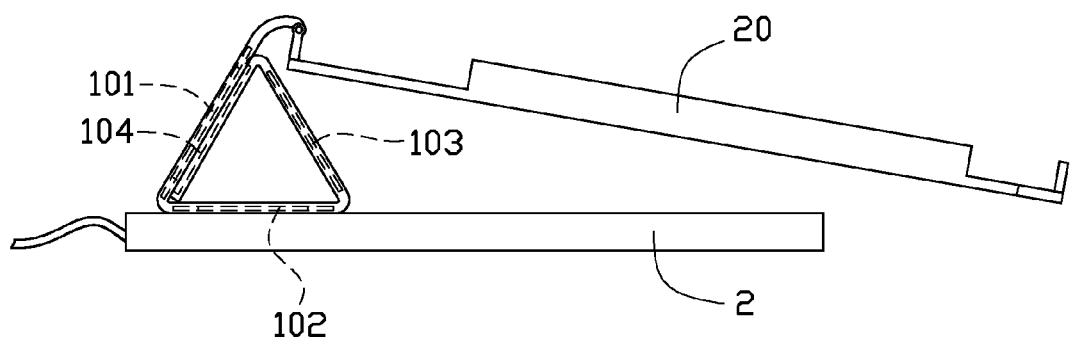
FIG. 4 is an isometric view of a third induction coil of the cover of FIG. 1 being used to charge the electronic device.

As shown in FIGS. 3-4, the top cover 10 may be folded to form a triangular shape to support the electronic device connected to the cover 1 at a certain degree for ease of use during charging. In the embodiment, the top cover 10 is made of flexible material for ease of folding.

As shown in FIG. 3, the second induction coil 101 is horizontally placed onto the charging base 2 with the solar panel 104 overlapping the second induction coil 101. Thus, the electronic device can be supported at a comfortable angle for users during charging.

As shown in FIG. 4, the third induction coil 102 is placed onto the charging base 2 which is placed in the horizontal plane, the solar panel 104 overlaps the second induction coil 101. Thus, the electronic device can be supported by the cover 1 at the degree as shown in FIG. 4 while the electronic device is charged by the third induction coil 102.

In the embodiment, when the electronic device is not connected to the cover 1, the second induction coil 101 or the third induction coil 102 can be placed onto the charging base 2 to charge for the battery 103. The solar panel 104 also can be used to charge the battery 103.

In other embodiments, the top cover 10 may instead be transversely divided into at least three parts provided at least one part includes an induction coil and the cover can be folded to support the electronic device. If only three parts are provide the solar panel 104 may be omitted or imbedded in one of the remaining parts with another of the components.

In other embodiments, the cover 1 may include more than just a top and bottom cover, e.g. a three-fold cover.

Although, the present disclosure has been specifically described on the basis of preferred embodiments, the disclosure is not to be construed as being limited thereto. Various changes or modifications may be made to the embodiment without departing from the scope and spirit of the disclosure.

What is claimed is:

1. A cover for an electronic device, comprising:
an interface for connecting with the electronic device;
a bottom cover; and
a top cover connected to the bottom cover, wherein the top cover is substantially sheet-shaped and divided into at least three foldable parts, every adjacent two parts of the at least three foldable parts are capable of being folded relative to each other to a certain degree such that the top cover is folded to support the electronic device at a certain degree;
wherein the at least three foldable parts of the top cover comprises at least one part comprising one induction coil and the top cover is capable of being folded to support the electronic device at a certain degree while the induction coil is used to charge for the electronic device.

2. The cover as described in claim 1, wherein the bottom cover comprises a bottom cover induction coil, and the bottom cover induction coil is connected to the interface.

3. The cover as described in claim 1, wherein the number of the at least one part that comprises one induction coil in the top cover is two, and each of the two parts comprises one induction coil.

4. The cover as described in claim 3, wherein one part of the at least three parts comprises a battery connected to the interface, and the induction coils respectively comprised in the two parts of the top cover are connected to the battery.

5. The cover as described in claim 4, wherein one part of the at least three parts comprises a solar panel connected to the interface and the battery, the solar panel has surfaces exposed from the top cover.

6. The cover as described in claim 5, wherein when one of the two induction coils is horizontally placed onto a charging base, the solar panel is operable to overlap the induction coil which is placed onto the charging base.

7. The cover as described in claim 5, wherein when one of the induction coils is horizontally placed onto a charging base, the solar panel is operable to overlap the induction coil which is not placed onto the charging base.

8. The cover as described in claim 1, wherein when the electronic device is not connected to the cover, the induction coil comprised in at least one part of the top cover is operable to be placed onto a charging base to charge the battery.

9. The cover as described in claim 1, wherein the top cover of the cover is made of flexible material.

10. A cover for an electronic device, comprising:
an interface for connecting the electronic device;
wherein the cover is substantially sheet-shaped and divided into at least three parts, every adjacent two parts of the at least three foldable parts are capable of being folded relative to each other to a certain degree such that the cover is folded to support the electronic device at a certain degree, the at least three foldable parts comprises at least one part comprising one induction coil and the cover is capable of being folded to support the electronic device at a certain degree while the induction coil is used to charge for the electronic device.

11. The cover as described in claim 10, the number of the at least one part that comprises one induction coil is two, and each of the two parts comprises one induction coil.

12. The cover as described in claim 11, wherein one part of the at least three parts comprises a battery connected to the interface, and the induction coils respectively comprised in the two parts of the cover are connected to the battery.

13. The cover as described in claim 12, wherein one part of the at least three parts comprises a solar panel connected to the interface and the battery, the solar panel has surfaces exposed from the cover.

14. The cover as described in claim 13, wherein when one of the induction coils is horizontally placed onto a charging base, the solar panel is operable to overlap the induction coil which is placed onto the charging base.

15. The cover as described in claim 13, wherein when one of the two induction coils is horizontally placed onto a charging base, the solar panel is operable to overlap the induction coil which is not placed onto the charging base.

16. The cover as described in claim 10, wherein when the electronic device is not connected to the cover, the induction coil comprised in at least one part of the cover is operable to be placed onto a charging base to charge the battery.

17. The cover as described in claim 10, being made of flexible material.

* * * * *